United States Patent
Swearingen et al.

(10) Patent No.: US 10,843,241 B2
(45) Date of Patent: Nov. 24, 2020

(54) METHOD AND SYSTEM FOR IN SITU TREATMENT OF WATER OR SOIL

(71) Applicant: SPECIALTY EARTH SCIENCES, LLC, New Albany, IN (US)

(72) Inventors: Lindsay Swearingen, Floyds Knobs, IN (US); Jason Swearingen, Floyds Knobs, IN (US)

(73) Assignee: Specialty Earth Sciences, LC, New Albany, IN (US)

( * ) Notice: Subject to any disclaimer, the term of this patent is extended or adjusted under 35 U.S.C. 154(b) by 0 days.

(21) Appl. No.: 15/995,726

(22) Filed: Jun. 1, 2018

(65) Prior Publication Data
US 2019/0366401 A1    Dec. 5, 2019

(51) Int. Cl.
| | |
|---|---|
| B09C 1/00 | (2006.01) |
| C02F 1/68 | (2006.01) |
| B09C 1/08 | (2006.01) |
| C02F 103/06 | (2006.01) |

(52) U.S. Cl.
CPC ............... B09C 1/002 (2013.01); B09C 1/08 (2013.01); B09C 2101/00 (2013.01); C02F 1/686 (2013.01); C02F 1/687 (2013.01); C02F 2103/06 (2013.01); C02F 2209/40 (2013.01); C02F 2209/44 (2013.01)

(58) Field of Classification Search
CPC .................... B09C 1/002; B09C 2101/00
See application file for complete search history.

(56) References Cited

U.S. PATENT DOCUMENTS

| | | | | |
|---|---|---|---|---|
| 5,143,606 A * | 9/1992 | Bernhardt | .......... | B01D 19/0005 166/242.1 |
| 5,525,008 A * | 6/1996 | Wilson | ...................... | B09C 1/00 405/128.5 |
| 6,102,621 A * | 8/2000 | Siegrist | ..................... | B09C 1/00 405/128.5 |
| 6,472,198 B1 * | 10/2002 | Semprini | ................ | B09C 1/002 210/601 |
| 7,264,419 B2 * | 9/2007 | Bowman | ................. | B09C 1/002 210/747.8 |
| 2002/0141827 A1 * | 10/2002 | Breeding | ............... | B09C 1/002 405/128.75 |
| 2003/0069142 A1 * | 4/2003 | Beal | ........................ | B09C 1/002 507/200 |
| 2011/0293492 A1 * | 12/2011 | Gustafson | ............... | B09C 1/002 423/3 |

* cited by examiner

*Primary Examiner* — Janine M Kreck
(74) *Attorney, Agent, or Firm* — Steve Witters; Witters & Associates (57) ABSTRACT

A method and system for the in situ treatment of at least one contaminant in soil or water is disclosed herein. The method comprises placing an opening into the soil and into at least a portion of subsurface water and thereby filling at least a portion of the opening with the water, placing a reactant in the opening, and moving a portion of the water proximate the bottom of the opening toward the water proximate the top of the opening, thereby increasing the homogeneity of the reactant in the water.

20 Claims, 9 Drawing Sheets

METHOD AND SYSTEM FOR IN SITU TREATMENT OF WATER OR SOIL

FIELD OF INVENTION

The present invention relates to methods and systems for in situ treatment of soil or water, such as groundwater, more specifically towards methods and systems for treatment with the placement of reactants in the ground.

BACKGROUND OF THE INVENTION

Discharges of hazardous compounds into the environment have led to contamination of surface water, soil, and aquifers resulting in potential public health problems and degradation of the land for future use. As used in this specification and appended claims, hazardous compound means a chemical or substance that is either toxic or highly toxic, an irritant, corrosive, a strong oxidizer, a strong reducer, a strong sensitizer, combustible, either flammable or extremely flammable, dangerously reactive, pyrophoric, pressure-generating, a compressed gas, a carcinogen, a teratogen, a mutagen, a reproductive toxic agent, or is suspected of having adverse health effects on humans. In many cases, subsurface groundwater contaminant plumes may extend hundreds to thousands of feet from the source area of a chemical release resulting in extensive contamination. These chemical contaminants may then be transported into drinking water sources, lakes, rivers, and even basements of homes.

The U.S. Environmental Protection Agency (USEPA) has established maximum concentration limits (MCL's) for various hazardous organic and inorganic compounds in water and soils. For instance, stringent drinking water limits placed on many solvent organic compounds in water can be as low as 0.005 mg/L (parts per billion).

The presence of hazardous compounds in subsurface soils, surface water, and groundwater is a well-documented and extensive problem. The source of these hazardous materials is often times from industry where the materials are released onto the soil surface or surface water or even into the subsurface soil and/or groundwater, through leaking storage tanks for example. Many, if not most, of these compounds are capable of moving through the soil under the influence of moving water, gravity, or capillary action and serve as a source of groundwater contamination. As used in this specification and appended claims, soil is to be interpreted broadly to include all naturally occurring material found below ground surface (e.g. silts, clays, sands, rock, karsts, organics, tills, etc.).

Soil, surface water, groundwater, and wastewater can become contaminated by a variety of substances. The substances include, without limitation, metals, volatile, semi-volatile, and non-volatile organic compounds. Common examples of such contaminates include arsenic, barium, cadmium, chromium, lead, mercury, selenium, silver, PCBs, gasoline, oils, wood preservative wastes, and other hazardous organic compounds. Such other hazardous organic compounds may include, but not limited to, chlorinated solvents (such as trichloroethylene (TCE), vinyl chloride, tetrachloroethylene (PCE), and dichloroethanes), ethylene dibromide, halobenzenes, polychlorinated biphenyls, acetone, ter-butyl alcohol, tert-butyl formate, and anilines. Additional contaminants include compounds containing at least one oxidizable aliphatic or aromatic compound and/or functional group (e.g. atrazine, benzene, butyl mercaptan, chlorobenzene, chloroethylvinyl ether, chloromethyl methyl ether, chlorophenol, chrysene, cyanide ion or organic cyanides, dichlorophenol, dichlorobenzene, dichloroethane, dichloroethene, dichloropropane, dichloropropene, ethyl alcohol, ethylbenzene, ethylene glycol, ethyl mercaptan, hydrogen sulfide, isopropyl alcohol, Lindane™, methylene chloride, methyl tert-butyl ether, naphthalene, nitrobenzene, nitrophenol, pentachlorophenol, phenanthrene, phenol, propylene, propylene glycol, Silvex™, Simazine™, sodium sulfide, tetrachloroethane, tetrachloroethene, toluene, trichlorobenzene, trichloroethane, trichloroethene, trichlorophenol, vinyl chloride, xylene, etc).

Contaminated soil and groundwater may need be removed or treated to make it less toxic or to meet USEPA or other regulatory requirements. There are a variety of reactants and methods for treating contaminated soil, surface water, groundwater, and wastewater.

Peroxydisulfate's have been reported as applied constituents for organic carbon digestion or decomposition. Application methods may include thermally activated persulfate oxidation in conjunction with an electro-osmosis system to heat and transport persulfate anions into soils.

Permanganate(s) and peroxygen(s) reactant(s) have also been reported as applied constituents for oxidation of organic compounds. Peroxygen compound(s) applied independently or in conjunction with a metallic salt catalyst(s) (complexed and not complexed; chelated and not chelated) have been shown to break down organic compounds within the soil, groundwater, and wastewater.

Groundwater and subsurface soil typically has been treated by injecting reactant(s), with or without a catalyst(s), within an aqueous mixture, slurry, or suspension into the subsurface. Injection into the subsurface may be accomplished by gravity feed or the use of a pump(s) to increase well head pressure. This results in the subsurface dispersion of the reactant(s) within the area of the injection well.

Another method for in situ treatment of groundwater includes the boring of an opening or the excavation of a trench proximate or downstream of a subsurface plume of organic and/or inorganic contaminant(s). The opening or trench is filled with reactant(s) and a permeable media(s) (i.e. sand) for the plume to flow through, subsequently reacting oxidizable and/or reducable organic and/or inorganic compounds that come into contact with the reactant(s). These trenches filled with a reactant are often referred to as permeable reactive barriers (PRBs). One limiting factor in current methods of installing PRBs may be that structures, roads, or other improvements to the land above the installation site may need to be destroyed when digging the trench. Other limiting factors include, for example; the depth below ground surface that is achievable with trenching equipment compared to the depth of contamination; or the logistics and disposal costs associated with disposal of soil cuttings generated from PRB installation of the current art.

Because of these limitations of the art before the present invention, there is a need for improved methods and systems of in situ treatment of soil and groundwater contamination.

SUMMARY OF THE INVENTION

One aspect of the present disclosure provides a method for the in situ treatment of at least one contaminant in soil or water. An opening is placed in the soil and into at least a portion of subsurface water and thereby at least a portion of the opening is filled with the water. A reactant is then placed in the opening. A portion of the water proximate the bottom of the opening is moved toward the water proximate the top of the opening, thereby increasing the homogeneity of the reactant in the water.

Another aspect of the present disclosure provides a system for the in situ treatment of at least one contaminant in soil or water. The system has a water moving device configured to be disposed to move a portion of water proximate a bottom of an opening in the ground toward water proximate a top of the opening in the ground. A water inlet, inlet line or pipe is in flow communication with the water proximate the bottom of the opening in the ground and the water moving device. A water outlet, outlet line or pipe is in flow communication with the water proximate the top of the opening in the ground and the water moving device. The water in the opening in the ground has at least one reactant therein and the moving of the water increases the homogeneity of the reactant in the water in the opening in the ground.

DETAILED DESCRIPTION OF THE INVENTION

The present disclosure provides a method for the in situ treatment of contaminated groundwater or soil with environmental reactant(s). The presently disclosed system and method for in situ treatment of groundwater or soil includes the placement of a reactant in an opening or borehole that extends into an aquifer. The reactant may react with the contaminant in the aquifer as the contaminated water flows through a zone of influence of the reactant, or interceptor zone. One advantage of the presently disclosed system and method is that it may increase vertical dispersion or mixing of the reactant in the opening and potentially in the aquifer or zone of influence of the reactant.

Aspects of the present disclosure provide a method where one or more reactants are placed into an opening in the ground and into an aquifer. The reactant(s) may react with the contaminant in the aquifer as the contaminated water flows through a zone of influence of the reactant. The zone of influence of the reactant, or interceptor zone, may be the opening in the ground where the reactant(s) are placed and the zone of migration or movement of the reactant(s) in the subsurface or aquifer. To mitigate concentrating the reactant(s) in a lower portion of the opening, a portion of the water proximate the bottom opening may be move toward the top of the opening. This movement of reactant concentrated water may mitigate a concentration gradient of the reactant(s) in the opening and potentially in the interceptor zone or zone of influence of the reactant(s).

For example, a trench, pit, borehole, or other opening may be placed into the ground and extended into an aquifer. The opening may be placed into a contaminated plume, down gradient, or in the flow path of the contaminant in the aquifer. One or more reactants may be placed into the opening. As the water flows through or by the opening, the reactant(s) may be dissolved or dispersed in the water and may move through the subsurface with the aquifer. The reactant(s) may react with the contaminant(s) in the opening or in the zone of influence of the reactant.

The reactant(s) may tend to concentrate toward the bottom of the opening or interceptor zone as the reactant(s) may have a higher density than the water or they may increase the density of the water in which the reactant(s) are dissolved or dispersed. The higher concentration of reactant(s) in a lower portion of the opening may cause a vertical gradient or an uneven vertical distribution of the reactant(s) in the water or soil being treated. This vertical gradient of the reactant(s) may impede or negatively affect the treatment of the water or soil proximate the top of the opening or upper portion of the interceptor zone. This negative effect of treatment of the contaminant may be exasperated when the contaminant(s) tend to concentrate toward the upper portion of the water in the opening, for example, some organic contaminate(s) may tend to rise in the aquifer.

Aspects of the method of the present disclosure may mitigate the tendency of reactant(s) to concentrate toward a lower portion of the opening, zone of influence of the reactant or interceptor zone. Minimizing or mitigating the vertical gradient of the reactant in the opening and zone of influence of the reactant may enhance treatment of groundwater and soil. Movement of at least a portion of the water proximate the bottom of the opening toward the top of the opening may mitigate a density gradient or the concentration of the reactant(s) in the lower portion of the opening or zone of influence of the reactant.

For example, over time the reactant(s) may dissolve or disperse in the aquifer flowing through the opening and concentrate toward the bottom of the opening. Movement of a portion of the water proximate the bottom of the opening, having a higher concentration of the reactant(s), toward the top of the opening, may tend to vertically mix or thereby increase the homogeneity of the reactant in the water in the opening. The vertical movement of the water proximate the bottom of the opening toward the water proximate the top of the opening may decrease a concentration gradient of the reactant in the opening which may decrease a concentration gradient of the reactant in the zone of influence of the reactant(s), or interceptor zone, in the aquifer or soil being treated.

Figure 1:
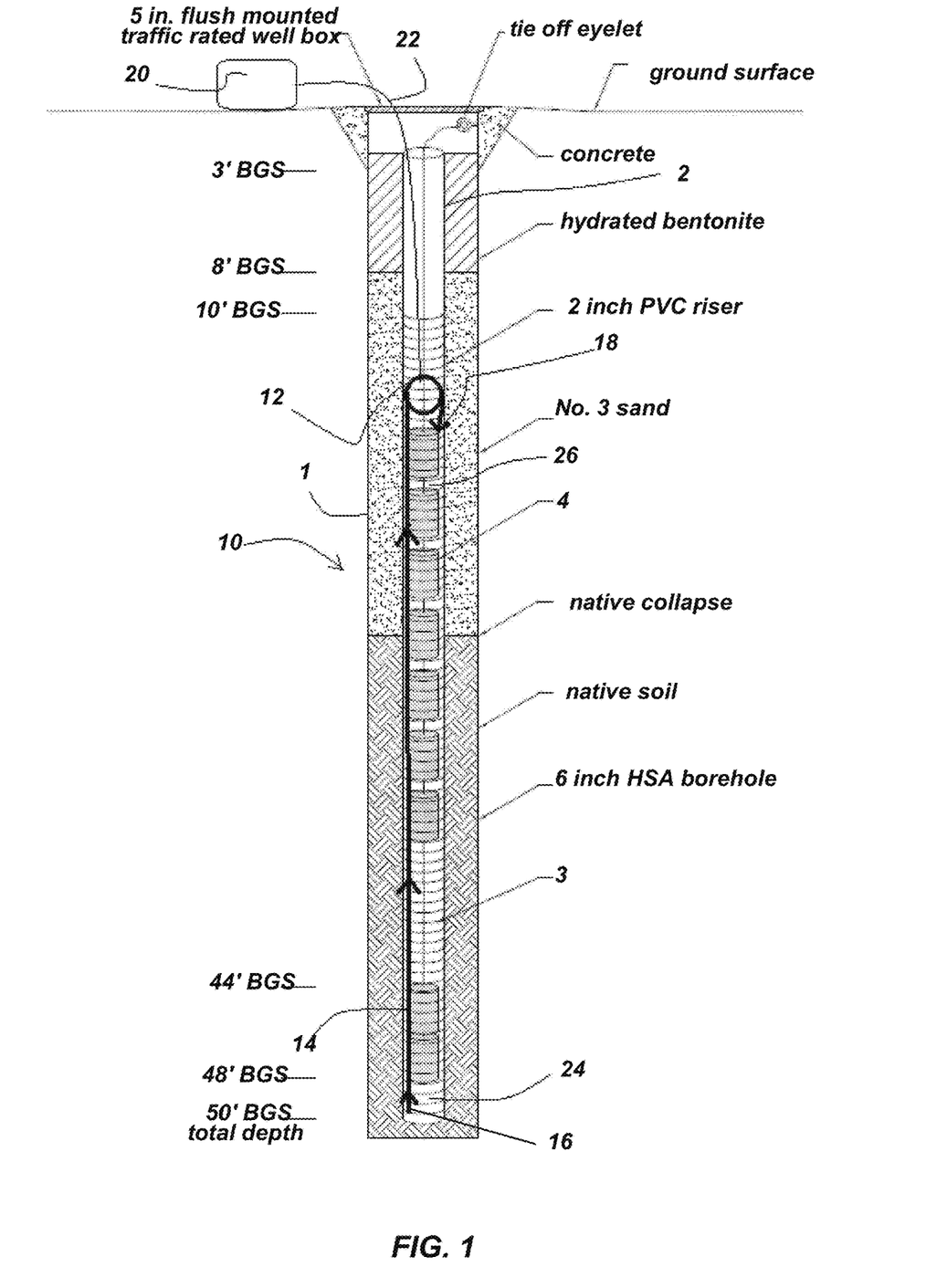
FIG. 1 is a cross-sectional view of an illustrative system for the in situ treatment of at least one contaminant in soil or water of the present disclosure.

FIG. 1 schematically shows a system 10 for the in situ treatment of at least one contaminant in soil or water of the present disclosure. Borehole 1 may have a deployment well 2 with screened sidewall 3 for the flow through of water. Deployment well 2 may be charged with solid reactants which may be placed into reactant holders 4. A string of reactant holders 4 may be suspended in borehole 1. Reactant holders 4 may have flow through outer walls wherein an aquifer may flow through screened sidewall 3 and reactant holders 4 and contact the reactant in reactant holders 4.

The contact of the water flowing in the aquifer with the reactant may cause the reactant to disperse or dissolve in the water in borehole 1. The reactant in the water in borehole 1 may tend to settle or become unevenly vertically distributed in the water in borehole 1. For example, the reactant may induce a density gradient of the water in borehole 1. An uneven distribution of the reactant in borehole 1 may not be desired as it may induce different levels of treatment within borehole 1 and down gradient of the aquifer, or in the zone of influence of the reactant. An uneven distribution of reactant within a zone of influence of the reactant, or interceptor zone, may have negative effects on treatment of the water or soil. The negative effect of uneven distribution of the reactant may be exemplified when the reactant tends to settle toward a lower portion of the interceptor zone and the contaminant(s) being treated tend to rise toward an upper portion of the interceptor zone. For example, some organic contaminants may tend to rise toward the upper portion of the aquifer.

The presently disclosed system and method may mitigate the uneven distribution of reactant(s) in borehole 1 and an interceptor zone, or zone of influence of the reactant(s). For example, a pump 12 may be placed in flow communication with the water in borehole 1 for mixing or redistributing the reactant in the water in borehole 1. In at least one embodiment of the present disclosure, pump 12 has an inlet proximate a lower portion of borehole 1. For example, inlet line 14 may have an inlet 16 proximate the lower portion of borehole 1 and feed pump 12. Pump 12 may have an outlet proximate an upper portion, or above, the water in borehole 12, for example outlet 18.

Operation of pump 12 moves water from the lower portion 24 of borehole 1 to water proximate an upper portion 26 of borehole 1. The movement of the water in the borehole 1 may mix or redistribute the reactant(s) in borehole 1. Operation of pump 12 may not be continuous as the movement of a selected volume of water from proximate the bottom of borehole 1 to the upper portion of borehole 1 may cause a desired redistribution of the reactant(s) in borehole 1. For example, over time reactant(s) may tend to concentrate toward the lower portion of borehole 1, water portion 24, and a movement of a small volume of the reactant concentrated water toward the top of borehole 1, water portion 26, may provide a desired redistribution of the reactant in the water in borehole 1. The moved volume of the reactant concentrated water may cause the reactant(s) to again tend to move or migrate toward the bottom portion 24 which may cause an increase in homogeneity of the reactant in the water in borehole 1. Alternately, operation of pump 12 may be continuous.

A controller 20 may be configured and disposed to control the operation of pump 12. In at least one embodiment of the present disclosure, pump 12 is placed in well 2 and controller 20 is in communication with pump 12, with communication line 22 for example. Controller 20 may be configured to control pumping cycles, or on/off cycles, of pump 12. For example, controller 20 may control pump 12 to move desired volumes of water at desired times or desired time intervals.

With reference to FIG. 1, a method for the in situ treatment of at least one contaminant in soil or water is presently disclosed. An opening is placed into the soil and into at least a portion of subsurface water and thereby filling at least a portion of the opening with the water. For example, well 2 may have flow through sidewalls or screened sidewalls 3. A reactant is placed in the opening, for example solid or liquid reactants may be placed directly into borehole 1 or solid reactants may be placed into reactant holders 4. A portion of the water proximate the bottom of the opening, water portion 24, is moved toward the water proximate the top of the opening, water portion 26, thereby increasing the homogeneity of the reactant in the water.

The movement of a portion of the water proximate the bottom of the opening, water portion 24, toward the top of the opening may be performed periodically with a wait period between each movement of the portion of water. For example, controller 20 may be configured to control periodic operation of pump 12. Controller 20 may be configured to control pump 12 for moving a portion of the water proximate the bottom of the opening to the water proximate the top of the opening for a set period of time and the wait period between each movement of the water may be greater than the set period of time for the movement of water. The pumping rate of pump 12 and the volume of water in borehole 1 may be factors considered for controlling pump 12 with controller 20. Another factor that may be considered is the rate of which the reactant(s) may tend to migrate toward lower water portion 24. In at least one embodiment of the present disclosure, between about 0.1% and 50% of the water in borehole 1 is moved from lower water portion 24 toward upper water portion 26, with each movement of water. In at least one other embodiment of the present disclosure, between about 5% and 25% of the water in borehole 1 is moved from lower water portion 24 toward upper water portion 26, with each movement of water. Pump 12 may be placed on the ground surface, in the opening in the ground, for example borehole 1, or proximate to, or in, the water in the opening. Alternatively, pump 12 may also be a submersible pump placed proximate to the bottom of the opening in the ground. The reactant placed in the opening may be a liquid reactant or a solid reactant. A solid reactant may be placed into a flow through chamber, for example flow through chambers or reactant holders 4, and reactant holders 4 may be placed in the water. A plurality of reactant holders 4 may be placed in the water. For example, reactant holders 4 may be place in a string and suspended into borehole 1, as shown in FIG. 1.

Figure 2:
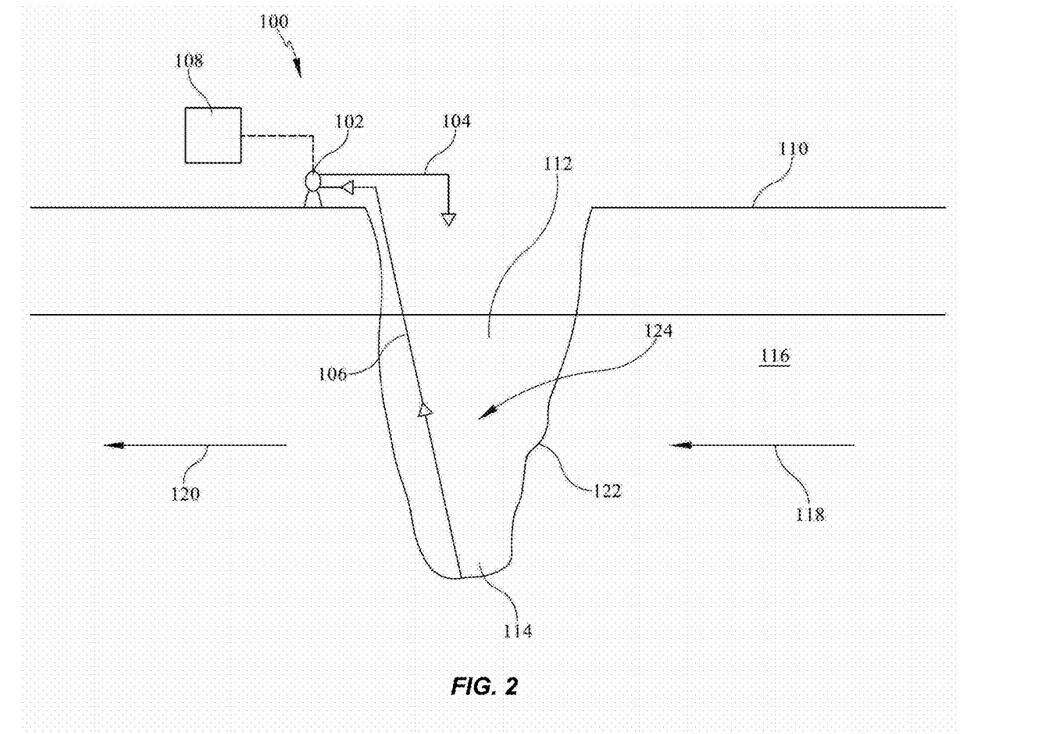
FIG. 2 shows an illustrative view of an embodiment of a system for the in situ treatment of at least one contaminant in soil or water of the present disclosure.

FIG. 2 schematically shows a system 100 for the in situ treatment of at least one contaminant in soil or water of the present disclosure. An opening 122 has been placed in the soil 110 and into at least a portion of subsurface water or aquifer 116. At least one reactant is placed in opening 122 and dispersed or dissolved in the water filled portion 124 of opening 122.

System 100 comprises a pump 102 configured and disposed to move a portion of the water 114 proximate the bottom of opening 122 toward the water 112 proximate the top of opening 122. A controller 108 may be configured and disposed to control the operation of pump 102. Controller 108 may have a timer which may turn pump 102 on and off at selected time intervals.

Pump 102 may be configured and disposed to draw water 114 from proximate the bottom of opening 122, through inlet line or pipe 106, and move the water 114 toward the water 112 proximate the top of opening 122, through outlet line or pipe 104. Water 114 may tend to have a higher concentration of reactant(s) than water 112 as the reactant(s) may dissolve or disperse in the water which may tend to establish a density gradient in water filled portion 124 of opening 122. The movement of a portion of the water 114 proximate bottom of opening 122 toward the water 112 proximate the top of opening 122, may increase the homogeneity of the reactant in water 124.

For example, aquifer 116 may have at least one contaminant and may flow toward opening 122 as indicated with flow arrow 118. The contaminated water may fill a portion of opening of opening 122. One or more reactants may be placed into opening 122 and dispersed or dissolved therein, dispersing the reactant(s) in water filled portion 124. Pump 102 may move the water in water filled portion 124 to mitigate tendencies of the reactant(s) to vertically concentrate. Aquifer 116 may then flow past opening 122, as indicated with flow arrow 120, which may carry the reactant(s) into a zone of influence of the reactant(s) or an interceptor zone. The movement of water in opening 122 may mitigate tendencies of the reactant(s) to vertically concentrate in the zone of influence as the reactant(s) may be introduced into the interceptor zone or zone of influence, as indicated by flow arrow 120, with increased homogeneity, as compared to no movement of water with pump 102.

In at least one embodiment of the present disclosure, system 100 is configured for the in situ treatment of at least one contaminant in soil or water. System 100 comprises water moving device 102 which is configured to be disposed to move a portion of water 114 proximate a bottom of opening 122 in ground 110 toward water 112 proximate a top of opening 122 in ground 110. Water inlet line or pipe 106 is in flow communication with the water 114 proximate the bottom of opening 122 in ground 110 and water moving device 102. Water outlet line or pipe 104 is in flow communication with the water 112 proximate the top of opening 122 in ground 110 and water moving device 102.

Water 124 in opening 122 in ground 110 has at least one reactant therein. The reactant(s) may be liquid or solid reactant(s). The solid reactant(s) are configured to disperse or dissolve in water 124. The moving of water 124, having the at least one reactant, with water moving device 102 increases the homogeneity of the reactant(s) in water 124 in opening 122 in ground 110.

Water moving device 102 may be a pump or other device configured for moving water as is know by persons having ordinary skill in the art. System 100 may have a controller 108 configured to be disposed to control water moving device 102 and to periodically move a portion of the water 114 for a set period of time with a wait period between each movement. The wait period between each movement of the water may be greater than the set period of time for the movement of water 114. For example, controller 108 may be configured to control water moving device 102 to move between about 0.1% and 50% of water 124 in opening 122 in ground 110.

Water moving device 102 may be configured to be placed into opening 122 in ground 110. Placement of water moving device 102 into opening 122 may provide for more efficient movement of water as water may not need to be lifted above the upper surface of aquifer 116. For example, water moving device 102 may be placed in water 124 and have an outlet in upper portion of water 112. Water moving device 102 may be placed in lower portion 114 and may not require an inlet line 106.

System 100 may have a plurality of the water moving devices 102, each of the water moving devices may be configured to be disposed to move a portion of water 114 proximate a bottom of a separate individual opening 122 in ground 110 toward water 112 proximate a top of the separate individual opening 122 in ground 110. An interceptor zone may be formed with a plurality of openings 122 and each of the water moving devices 102 may be configured to be disposed with one separate individual opening 122, in the plurality of openings 122, in ground 110, forming the interceptor zone. The interceptor zone may have selected openings 122 for mixing, or redistribution, of the reactants to provide a selected vertical distribution of at least one reactant placed into opening 122 in ground 110.

It may be advantageous to move the entire volume or even several volumes of water contained in the opening during a single pump cycle or movement of water. The pumping rate(s), frequency of pump cycle(s), and/or length of pump cycle(s) may be adjusted in order to affect hydro-geological conditions proximate to an individual opening 122 and/or to enhance reactant distribution between openings in an interceptor zone or in a contaminant treatment area with a plurality of openings 122. Controller 108 may be configured to control multiple systems 100, pumps, valves, solenoids, switches, actuators, and/or relays. It may be advantageous to configure controller 108 to vary and/or alternate the pumping rate(s), frequency of pump cycle(s), and/or length of pump cycle(s) between multiple systems in order to enhance such effects on hydro-geological conditions and/or reactant distribution. Pumping rate(s), frequency of pump cycle(s), and/or length of pump cycle(s) may affect proximal hydro-geological conditions such as, for example; direction of groundwater flow, hydraulic gradient, and depth of groundwater.

In addition to pumping rate(s), frequency of pump cycle(s), and/or length of pump cycle(s), the vertical and/or horizontal reactant distribution in an interceptor zone or in a contaminant treatment area may also be affected by factors un-related to pumping or mixing. These factors include, for example; distance between openings, mass of reactant placed therein, the release rate of solid encapsulated reactant placed therein, in situ consumption rate of the reactant placed therein, hydraulic conductivity, groundwater velocity, seasonal fluctuations in groundwater elevation, depth and location of deployment well screened interval, and depth and location of reactant placement.

The reactant(s) employed with the presently disclosed system and method may be liquid or solid. The reactant(s) may be capable, or become capable, of moving through the soil under the influence of moving water, gravity, concentration gradient, or capillary action and may move with the ground water and contaminants in the ground water.

Solid reactant(s) may be placed directly into an opening in the ground or into a reactant holder or a plurality of reactant holders. For example, a string of reactant holders may be suspended in an opening in the ground or a borehole. Each of the reactant holders may be configured to hold solid reactant(s) and for the flow through of the water in the opening in the ground. For example, a reactant holder may have a slotted, perforated, porous, or permeable wall, or may otherwise be configured to permit the flow through of water. The reactant holders may be configured to be filled or recharged.

The reactant(s) may comprise an oxidant or oxidants, a reductant or reductants, one or more reactive materials selected from the group consisting of peroxides, permanganates, persulfates, hypochlorite solutions, ozone, zero valent iron, fluorine, sodium bisulfate, metabisulfide, polysulfide, and any combination thereof. The solid reactant may comprise reactive materials comprising particles substantially encapsulated with an encapsulant. For example, the encapsulated reactant disclosed in U.S. Pat. No. 7,431,849, to Swearingen et al., incorporated herein by reference. The encapsulant or encapsulate may have a characteristic selected from the group consisting of substantially oleophilic, hydrophobic, siliphilic, hydrocarbon soluble, and combinations thereof.

The reactant(s) the present disclosure may comprise a variety of reactants or combination of reactants. The solid reactant may comprise one or more oxidants, reductants, or reactive materials selected from the group consisting of peroxides, permanganates, persulfates, hypochlorite solutions, ozone, zero valent iron, fluorine, sodium bisulfate, metabisulfide, polysulfide, and any combination thereof.

The solid reactant(s) may be suspended solid reactant(s) and/or encapsulated reactant(s) and may provide a means for controlling the release and/or distribution of the reactant(s) thus providing a means for targeting a contaminant or controlling the reactivity of the reactant to minimize reaction with naturally occurring elements in the groundwater or other benign constituents, saving or preserving at least a portion of the reactant to react with contaminants. In at least one embodiment of the present disclosure, at least one solid reactant is contained within a solid coating or encapsulating material such as a wax. For example, solid blocks, slabs, or other shaped masses of encapsulating material(s) and reactant(s) may be placed into the boreholes. These masses may be size reduced, by chipping, shredding, or granulating, for example, prior to feeding into a borehole. These chips or reduced sized masses of encapsulating material(s) and reactant(s) may be put into a suspension, allowing them to flow into the borehole.

The controlled release and/or distribution of the reactant(s) may be manipulated via a suspending liquid and/or encapsulating coating which targets contaminants or specific organic compounds in the environmental media being treated. The reactants may be oxidants, reductants, catalysts, chelants, transition metal amine complexes, combinations thereof, and/or other chemical constituents that effectuate an initial, intermediate, and/or final reaction with the compound(s) being treated. The reaction between the reactant(s) and the contaminants renders at least a portion of the media being treated to have at least one less hazardous characteristic.

A suspension having reactant(s) may be comprised of reactant particles suspended in a liquid. The liquid may have for example water, emulsifiers, surfactants, and/or other substances as are known in the art to substantially suspend the solid reactant(s) in a suspension or slurry. For example, a solid reactant may be in slurry and a liquid portion of the slurry may provide for the masking, protecting, stabilizing, delaying, and/or controlling the release and/or distribution of the reactant(s).

The method of using reactants for the in situ treatment of soil or groundwater may utilize a combination of one or more reactants. The reactant(s) may be applied directly, suspended, coated, and/or encapsulated. The reactant(s) may comprise oxidant(s), reductant(s), metallic salt catalyst(s), and/or chelating agent(s) under conditions which enable oxidation or reduction of most, and preferably substantially all, volatile, semi-volatile, or non-volatile organic and/or inorganic compounds such as heavy metals in soil, rock, sludge, water, groundwater, and/or wastewater rendering them less harmful.

In one embodiment of the present invention, a combination of oxidant(s) (a persulfate group—potassium or sodium), catalyst(s) (iron salt), with or without a chelating compound(s) (EDTA), encapsulated or unencapsulated, are placed into an opening in the ground simultaneously within an aqueous mixture, slurry, or suspension. For instance, a combination of suspended reactant(s) may include a first group of suspended, free, coated, and/or encapsulated reactants having persulfate and a second group of suspended, free, coated and/or encapsulated reactants having ferrous sulfate. The suspended, free, coated and/or encapsulated reactants may remain substantially unreactive within the subsurface until contact with a contaminant occurs. Upon contact, the suspending liquids, coatings, and/or encapsulants about the reactants may begin to degrade, weaken, or become more permeable until the reactant contacts the contaminant(s). Alternately, the reactants may slow-release or time-release upon contact with water. The oxidant and/or catalyst and/or chelating agent react independently or in combination, resulting ultimately in the partial or complete oxidation of the contaminant(s). The final by-products of the oxidation reaction may be carbon dioxide, water, a salt group (depending on oxidant of choice), and an inorganic chloride ion (if contaminant is chlorinated).

Presently disclosed is a system and method for the treatment of soil or ground water. The present disclosure may aid in the dispersion or mixing of one or more reactants in the media being treated. The following example is provided to further disclose the present system and method and is not to limit the scope the claims.

EXAMPLE

Figure 3:
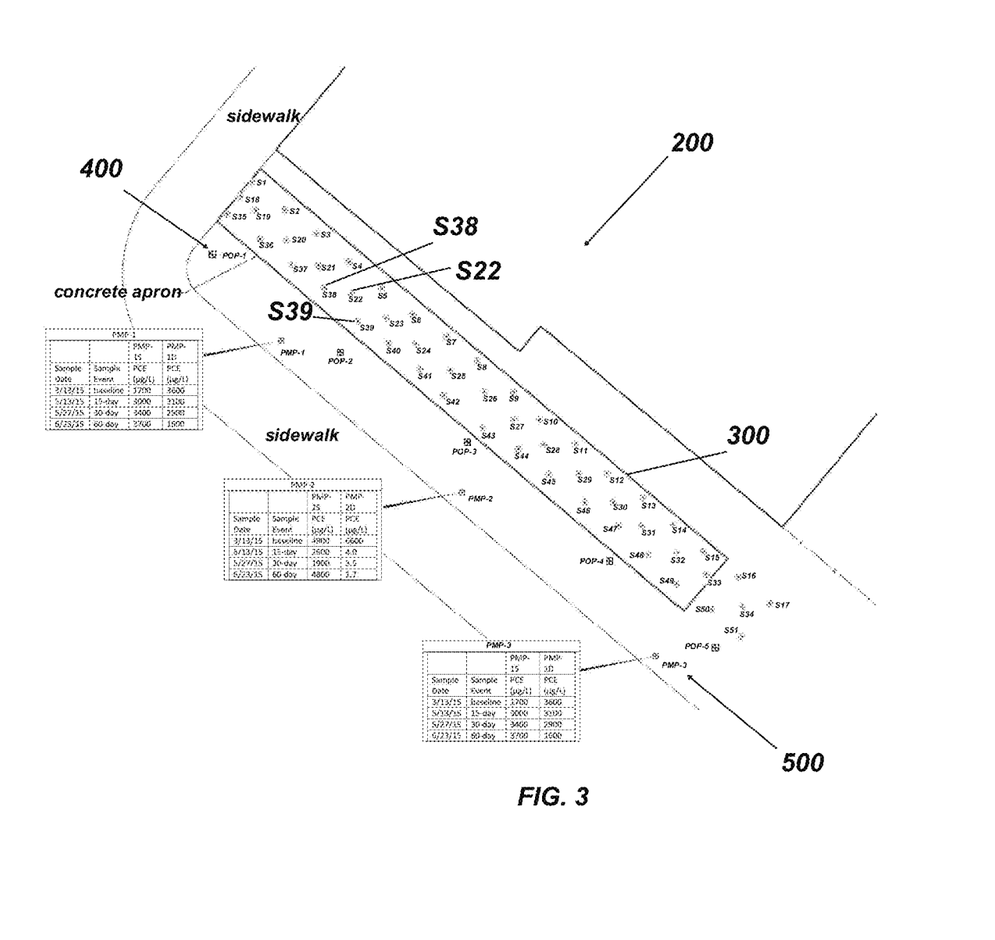
FIG. 3 shows an interceptor zone formed with a plurality of the systems for the in situ treatment of at least one contaminant in soil or water shown in FIG. 1 and an observation zone and a performance monitoring zone.

As shown in FIG. 3, an interceptor zone 300 was placed down gradient from a contamination zone 200 comprising Perchloroethylene, PCE, in an aquifer. Interceptor zone 300 was charged with a reactant. An observation zone 400 was placed down gradient from interceptor zone 300 to monitor reactant concentrations. A performance monitoring zone 500 was placed down gradient from observation zone 400 to monitor contaminant concentrations in the aquifer.

Interceptor zone 300 comprised a plurality of boreholes, S1-S51, spaced about 5 to 6 feet apart. Each borehole was completed with a screened PVC deployment well, as shown in FIG. 1. Each deployment well was charged with solid reactants comprising encapsulated permanganate. S1-S51 were charged by suspending flow through holders holding the reactant as shown in FIG. 1.

Figure 4:
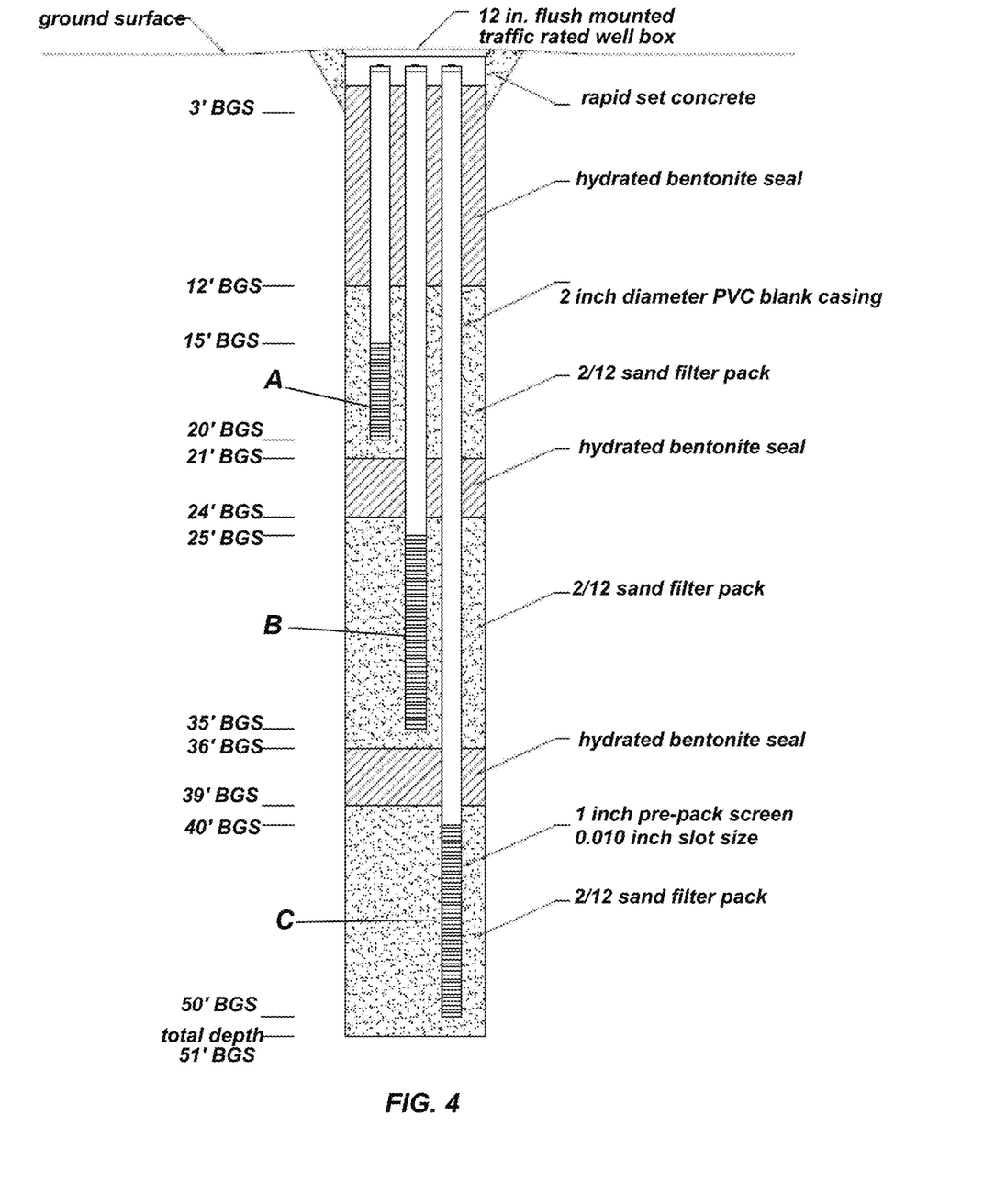
FIG. 4 shows an illustrative cross-sectional view of an observation well employed in the observation zone shown in FIG. 3.

Observation zone 400 comprised a plurality of boreholes, POP1-POP5. Each borehole comprised three well casings, and each well casing had screened intervals at different levels (level A, level B, and level C) as shown in FIG. 4.

Figure 5:
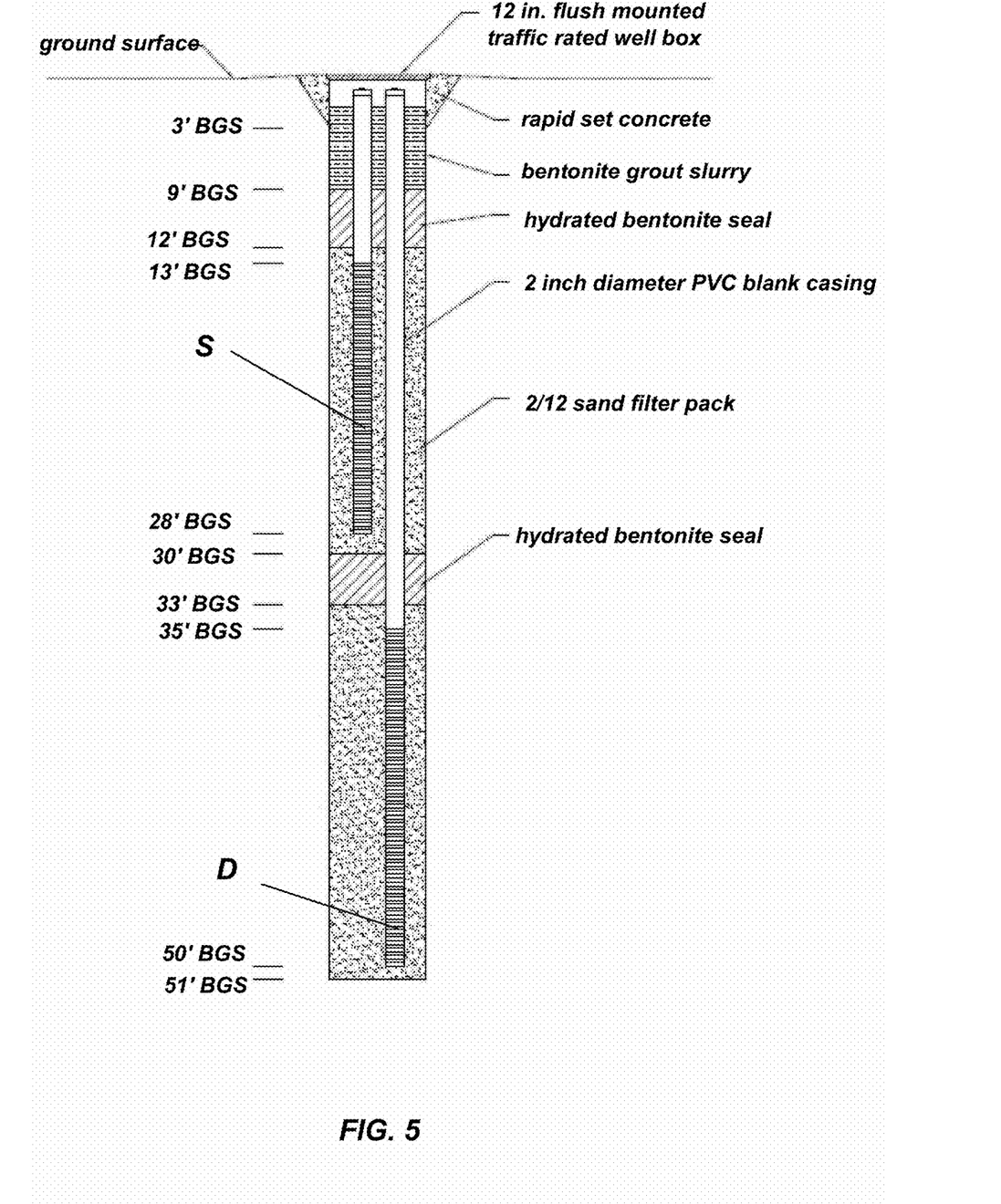
FIG. 5 shows an illustrative cross-sectional view of a performance monitoring well employed in the performance monitoring zone shown in FIG. 3.

Performance monitoring zone 500 comprised a plurality of boreholes, PMP1-PMP3. Each borehole comprised two well casings, and each well casing had screened intervals at different levels (level S and level D) as shown in FIG. 5.

A group of deployment wells in the interceptor zone (S-22, S-38, and S-39) was selected for in-well mixing, by moving a portion of the water proximate the bottom of the deployment well toward the water proximate the top of the water table. Movement of the water was performed with a pump having a pumping rate of approximately 1 gal/min. Each pump was run for about one minute four times a day, or about every 6 hours. It is estimated that about 15% of the water volume contained in each deployment well was moved from the bottom of the well to the top of the well with each water movement or pumping cycle.

Figure 6:
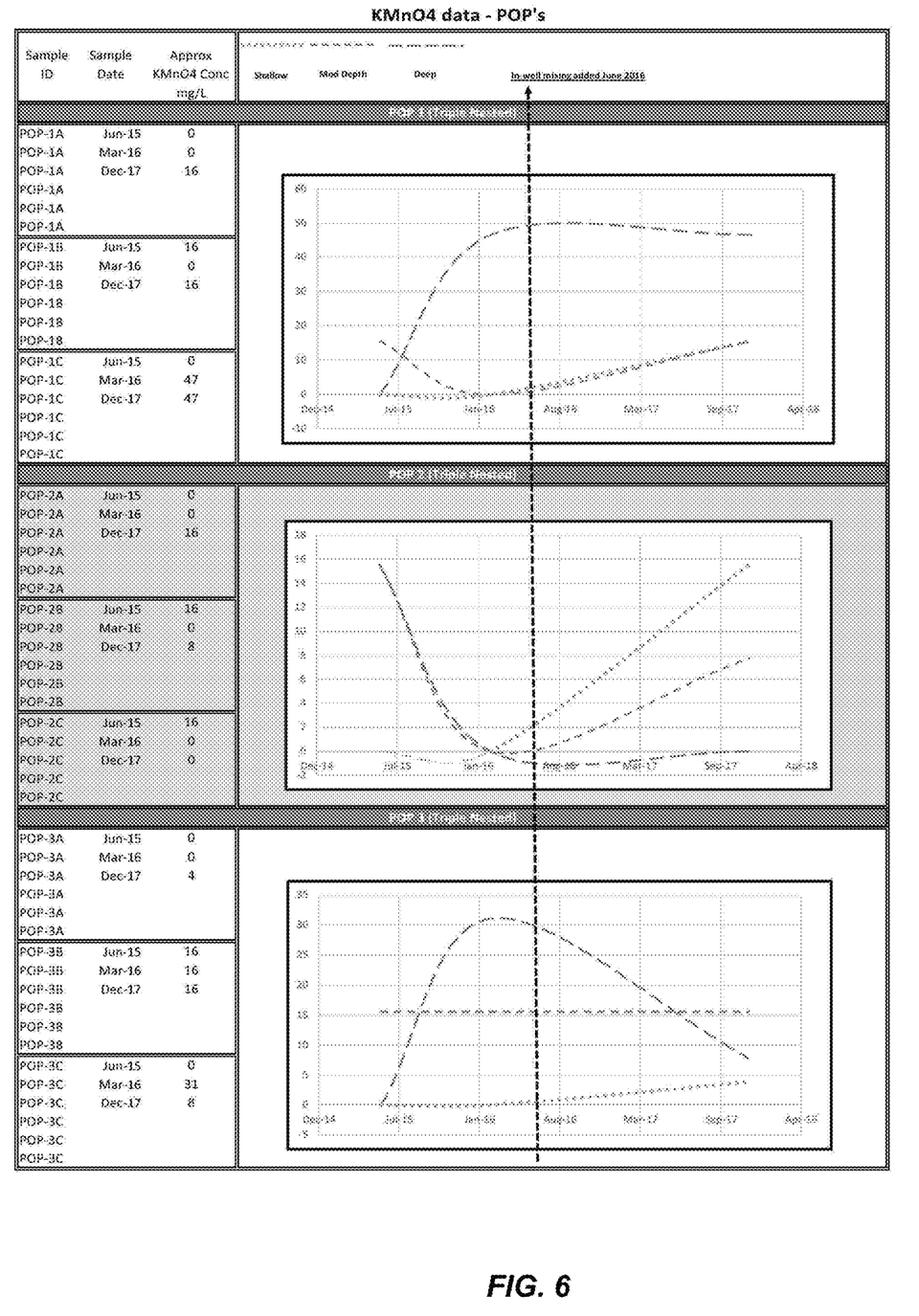
FIG. 6 shows concentrations of a reactant in the observation zone of Example 1.

Periodically, samples were taken from selected wells in observation zone 400 (POP1, POP2, and POP3) and the samples were analyzed for the concentrations of the reactant charged in interceptor zone 300. This data is shown in FIG. 6 for the three different levels in each of the three boreholes observed. For example, data point POP-1A is taken form borehole POP1 at the shallow level A well.

Figure 7A:
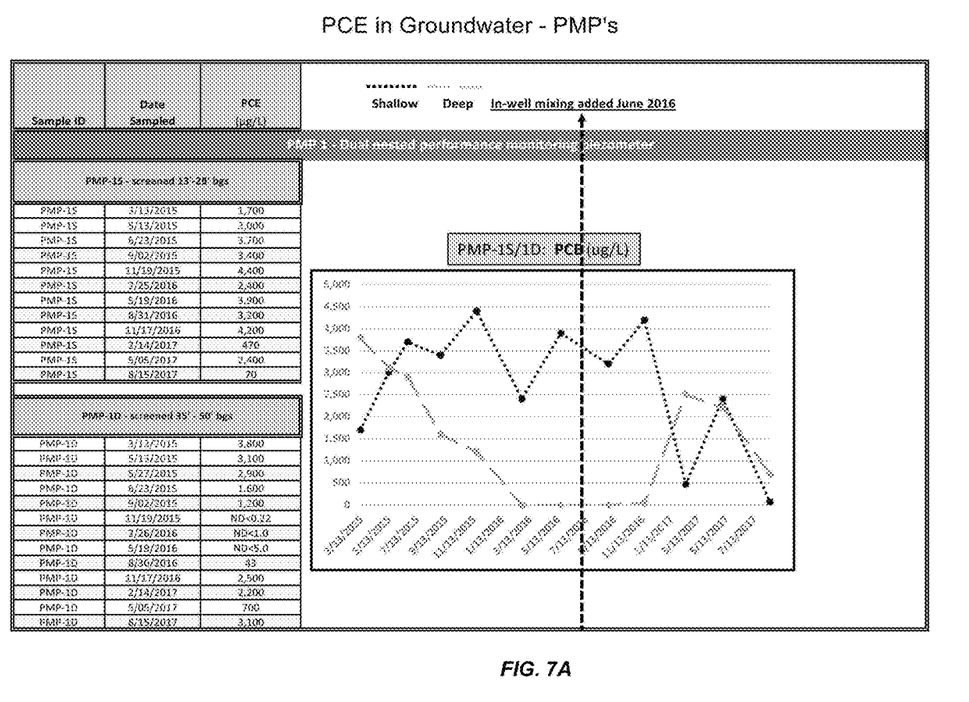
FIGS. 7A-7C show concentrations of a contaminant in the monitoring zone of Example 1.
Figure 7B:
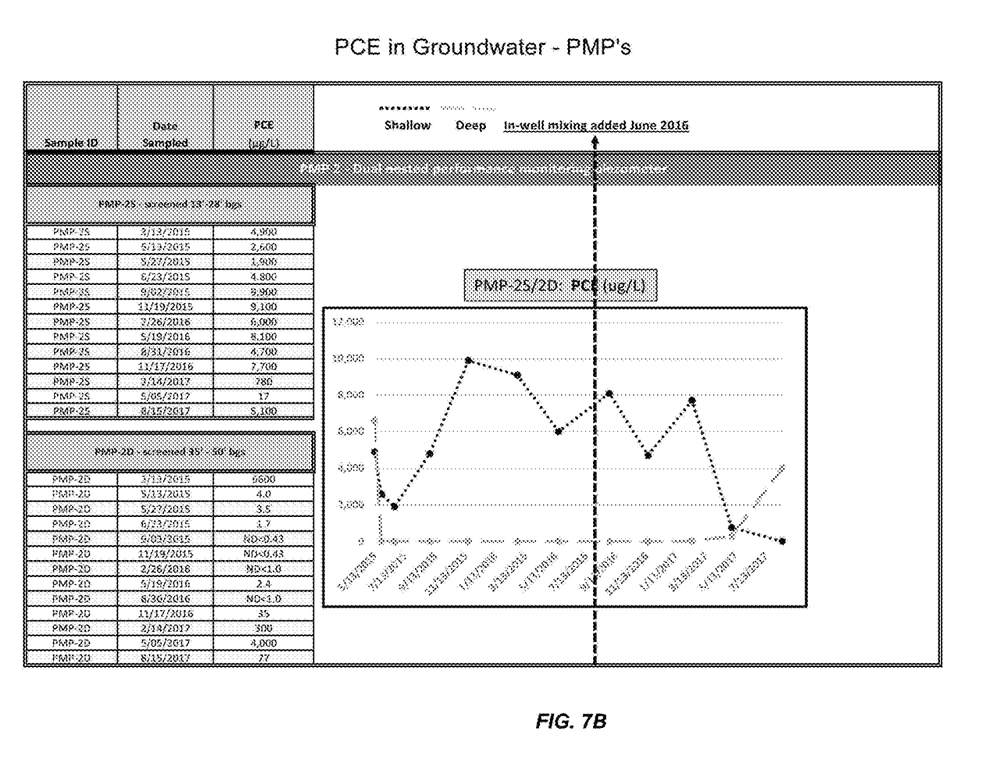
Figure 7C:
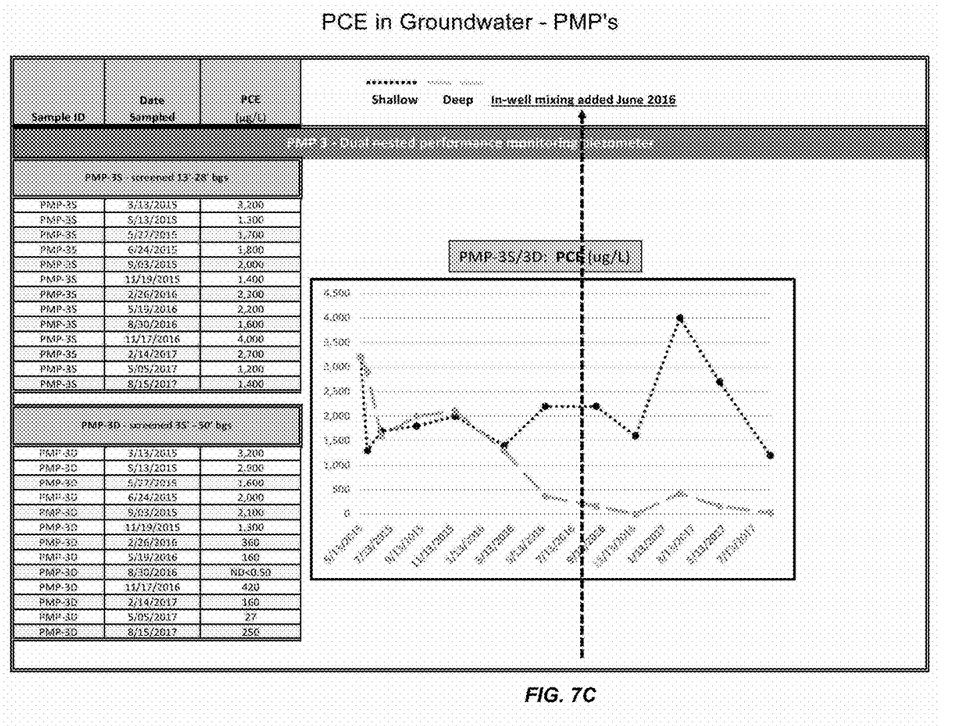

Periodically, samples were taken from selected wells in performance monitoring zone 500 (PMP1, PMP2, and PMP3) and the samples were analyzed for the PCE contaminant flowing from contamination zone 200. This data is shown in FIGS. 7A, 7B, and 7C for the two different levels, shallow level S and deep level D, in each of the three boreholes monitored. For example, data point PMP-1S is taken form borehole PMP1 at the shallow level S well.

Deployment wells S-S51 were charged with the solid reactant in early-2015, and in-well mixing was started in June of 2016. The in-well mixing was performed by periodically moving a portion of the water proximate the bottom of the deployment well toward the water proximate the top of the water table, in boreholes S-22, S-38, and S-39, as disclosed above.

With reference to the data in FIG. 6, it is shown that the concentration of the reactant KMnO4 rises at the shallow depths in all three monitored locations, POP-1A, POP-2A, and POP-3, upon initiation of the in-well mixing in June of 2016. Additionally, on the average, the concentrations of KMnO4 are shown to converge to a more uniform concentration at each level, shallow level A, medium level B, and deep level C, in the permanganate observation wells as the in-well mixing continues.

With reference to the data in FIGS. 7A-7C, it is shown that, on the average, the concentrations of PCE at the shallow levels decrease in the shallow level S performance monitoring wells upon the initiation of the in-well mixing.

The invention claimed is:

1. A method for the in situ treatment of at least one contaminant in soil or water comprising the steps of:
    placing an opening into the soil and into at least a portion of subsurface water and thereby filling at least a portion of the opening with the water;
    placing a reactant in the opening and thereby introducing at least a portion of the reactant into the water in the opening;
    moving, in the opening, a portion of the water and the reactant proximate the bottom of the opening toward the top of the opening;
    stopping the moving of the water and the reactant in the opening and waiting for a period of time, thereby settling the reactant in the opening and concentrating the reactant proximate the bottom of the opening; and
    moving, in the opening, a portion of the water and the reactant proximate the bottom of the opening toward the top of the opening and thereby increasing the homogeneity of the reactant in the water in the opening.

2. The method for the in situ treatment of at least one contaminant in soil or water of claim 1, wherein the step of moving a portion of the water and the reactant proximate the bottom of the opening toward the top of the opening is performed periodically with the wait period between each movement.

3. The method for the in situ treatment of at least one contaminant in soil or water of claim 2, wherein the step of moving a portion of the water and the reactant proximate the bottom of the opening toward the water proximate the top of the opening is performed for a set period of time and the wait period between each movement is greater than the set period of time.

4. The method for the in situ treatment of at least one contaminant in soil or water of claim 1, wherein the step of moving a portion of the water and the reactant proximate the bottom of the opening toward the water proximate the top of the opening comprises moving between about 0.1% and 50% of the water in the opening.

5. The method for the in situ treatment of at least one contaminant in soil or water of claim 4, wherein the step of moving a portion of the water and the reactant proximate the bottom of the opening toward the water proximate the top of the opening comprises moving between about 5% and 25% of the water in the opening.

6. The method for the in situ treatment of at least one contaminant in soil or water of claim 1, wherein the step of moving a portion of the water and the reactant proximate the bottom of the opening toward the water proximate the top of the opening comprises pumping the portion of water and the reactant.

7. The method for the in situ treatment of at least one contaminant in soil or water of claim 6 further comprises a step of placing a pump in the opening.

8. The method for the in situ treatment of at least one contaminant in soil or water of claim 7, wherein the step of placing a pump in the opening comprises placing a pump in or proximate to the water in the opening.

9. The method for the in situ treatment of at least one contaminant in soil or water of claim 1, wherein the step of placing a reactant in the opening comprises adding a liquid reactant to the water in the opening.

10. The method for the in situ treatment of at least one contaminant in soil or water of claim 1, wherein the step of adding a reactant to the water in the opening comprises adding a solid reactant to the water.

11. The method for the in situ treatment of at least one contaminant in soil or water of claim 10, wherein the step of adding a reactant to the water in the opening comprises placing the solid reactant into a flow through holder and placing the flow through holder in the water.

12. The method for the in situ treatment of at least one contaminant in soil or water of claim 11, wherein the step of placing the flow through holder in the water comprises placing a plurality of flow through holders in the water.

13. A system for the in situ treatment of at least one contaminant in soil or water, the system comprising:
    a moving device configured to be disposed to periodically move, in an opening in the ground, a portion of water and at least one reactant proximate a bottom of the opening in the ground toward the water and the at least one reactant proximate a top of the opening in the ground;
    an inlet, inlet line or pipe, in flow communication with the water and the at least one reactant proximate the bottom of the opening in the ground and the moving device;
    an outlet, outlet line or pipe, in flow communication with the water and the at least one reactant proximate the top of the opening in the ground and the moving device; and
    wherein the opening in the ground has a sole length of a continuously extending flow through sidewall; and
    wherein the at least one reactant settles in the opening in the ground and concentrates proximate the bottom of the opening in the ground and the moving of the water and the at least one reactant increases the homogeneity of the reactant in the water in the opening in the ground.

14. The system for the in situ treatment of at least one contaminant in soil or water of claim 13, wherein the moving device is a pump.

15. The system for the in situ treatment of at least one contaminant in soil or water of claim 13 further comprising a controller, the controller being configured to be disposed to control at least one of a rate, a frequency, and an operating time of the moving device.

16. The system for the in situ treatment of at least one contaminant in soil or water of claim 15, wherein the controller is configured to control the moving device to move between about 0.1% and 50% of the water in the opening in the ground.

17. The system for the in situ treatment of at least one contaminant in soil or water of claim 15, wherein the controller is configured to be disposed to control the moving device and to and to periodically move the portion of the water and the reactant for a set period of time with a wait period between each movement of the portion of the water and the reactant, wherein the wait period between each movement is greater than the set period of time.

18. The system for the in situ treatment of at least one contaminant in soil or water of claim 13 comprising a plurality of the moving devices, each of the moving devices being configured to be disposed to move a portion of the water and the reactant proximate a bottom of a separate individual opening in the ground toward the water and the reactant proximate a top of the separate individual opening in the ground.

19. The system for the in situ treatment of at least one contaminant in soil or water of claim 18, wherein each of the moving devices are configured to be disposed with one of the separate individual openings in the ground to form an interceptor zone having a selected distribution of at least one reactant placed into the openings in the ground.

20. The system for the in situ treatment of at least one contaminant in soil or water of claim 13 further comprising a plurality of reactant holders, each of the reactant holders being configured to hold a solid reactant and for the flow through of the water in the opening in the ground.

* * * * *